United States Patent
Medapalli et al.

(10) Patent No.: US 10,856,331 B1
(45) Date of Patent: Dec. 1, 2020

(54) DEVICES, SYSTEMS, AND METHODS FOR MITIGATING AGGRESSIVE MEDIUM RESERVATIONS

(71) Applicant: Cypress Semiconductor Corporation, San Jose, CA (US)

(72) Inventors: Kamesh Medapalli, San Jose, CA (US); Sangho Seo, San Jose, CA (US); Kenneth Ma, Los Altos, CA (US)

(73) Assignee: Cypress Semiconductor Corporation, San Jose, CA (US)

(*) Notice: Subject to any disclaimer, the term of this patent is extended or adjusted under 35 U.S.C. 154(b) by 0 days.

(21) Appl. No.: 16/718,003

(22) Filed: Dec. 17, 2019

Related U.S. Application Data

(60) Provisional application No. 62/916,061, filed on Oct. 16, 2019, provisional application No. 62/898,385, filed on Sep. 10, 2019.

(51) Int. Cl.
*H04W 4/00* (2018.01)
*H04W 74/08* (2009.01)
*H04W 24/08* (2009.01)
*H04W 72/04* (2009.01)
*H04W 16/14* (2009.01)

(52) U.S. Cl.
CPC ....... *H04W 74/0816* (2013.01); *H04W 24/08* (2013.01); *H04W 72/0446* (2013.01); *H04W 16/14* (2013.01)

(58) Field of Classification Search
CPC ............. H04W 74/0816; H04W 24/08; H04W 72/0446; H04W 16/14; H04W 40/02; H04W 40/246; H04W 56/00; H04W 84/18; H04W 40/08; H04L 45/40; H04L 45/02; H04L 45/12; H04L 47/14; H04B 2203/5408; H04B 2203/5416; H04B 2203/5433; H04B 2203/5445; H04B 3/54
See application file for complete search history.

(56) References Cited

U.S. PATENT DOCUMENTS

| | | | | |
|---|---|---|---|---|
| 4,533,994 A | * | 8/1985 | Harrill | G06F 13/26 710/40 |
| 4,707,829 A | * | 11/1987 | Pendse | H04L 12/433 340/2.7 |
| 5,150,358 A | * | 9/1992 | Punj | H04L 12/5602 370/412 |
| 5,157,659 A | * | 10/1992 | Schenkel | H04L 12/407 370/447 |
| 5,386,412 A | * | 1/1995 | Park | G06F 13/4022 370/270 |
| 5,774,658 A | * | 6/1998 | Kalkunte | H04L 12/413 370/445 |
| 6,522,660 B1 | * | 2/2003 | Mukaihara | H04M 3/51 370/443 |
| 6,606,327 B1 | * | 8/2003 | Lowe | H04L 12/4015 370/448 |

(Continued)

*Primary Examiner* — Stephen M D Agosta

(57) ABSTRACT

An example device detects a pattern of medium reservations by a first wireless device by detecting that the first wireless device has indicated a reservation duration that meets or exceeds a threshold duration value. Responsive to detecting the pattern of medium reservations, the device provides a mitigation operation to prevent a second wireless device from yielding the medium to the first wireless device.

24 Claims, 11 Drawing Sheets

(56) References Cited

U.S. PATENT DOCUMENTS

| | | | |
|---|---|---|---|
| 8,432,888 B2* | 4/2013 | Sakoda | H04L 1/0002 370/349 |
| 8,913,599 B2* | 12/2014 | Gonikberg | H04W 28/10 370/329 |
| 10,104,693 B1* | 10/2018 | Zhang | H04W 74/0816 |
| 10,616,922 B2* | 4/2020 | Wang | H04W 16/14 |
| 2003/0123405 A1* | 7/2003 | del Prado | H04W 16/14 370/331 |
| 2003/0134591 A1* | 7/2003 | Roberts, Jr. | G08C 17/02 455/3.06 |
| 2004/0204108 A1* | 10/2004 | Etkin | H04W 16/28 455/562.1 |
| 2004/0253940 A1* | 12/2004 | Andrews | H04L 47/10 455/405 |
| 2005/0068924 A1* | 3/2005 | Lindskog | H04L 47/14 370/338 |
| 2005/0147055 A1* | 7/2005 | Stephens | H04W 74/06 370/310 |
| 2007/0025382 A1* | 2/2007 | Jones | H04L 12/40019 370/431 |
| 2007/0076610 A1* | 4/2007 | Yang | H04L 47/14 370/235 |
| 2008/0119130 A1* | 5/2008 | Sinha | H04W 12/0808 455/1 |
| 2013/0286909 A1* | 10/2013 | Panneerselvam | H04W 52/0206 370/311 |
| 2014/0169186 A1* | 6/2014 | Zhu | H04L 5/00 370/252 |
| 2014/0254552 A1* | 9/2014 | Hayes | H04W 74/0816 370/331 |
| 2015/0081888 A1* | 3/2015 | Pham | H04L 43/0811 709/224 |
| 2015/0250002 A1* | 9/2015 | Sun | H04W 74/0808 370/329 |
| 2016/0029389 A1* | 1/2016 | Merlin | H04J 1/14 370/330 |
| 2016/0095110 A1* | 3/2016 | Li | H04W 72/1215 370/329 |
| 2016/0255530 A1* | 9/2016 | Li | H04W 24/10 370/329 |
| 2016/0255653 A1* | 9/2016 | Malik | H04W 74/0816 370/329 |
| 2016/0353437 A1* | 12/2016 | Sun | H04W 74/0808 |
| 2016/0353482 A1* | 12/2016 | Valliappan | H04L 5/22 |
| 2017/0006542 A1* | 1/2017 | Huang | H04W 48/20 |
| 2017/0111889 A1* | 4/2017 | Li | H04W 74/08 |
| 2017/0272183 A1* | 9/2017 | Matsuo | H04B 7/088 |
| 2018/0020448 A1* | 1/2018 | Huang | H04L 27/2602 |
| 2019/0034229 A1* | 1/2019 | Guo | G06F 11/3428 |
| 2019/0363843 A1* | 11/2019 | Gordaychik | H04W 8/22 |

* cited by examiner

US 10,856,331 B1

DEVICES, SYSTEMS, AND METHODS FOR MITIGATING AGGRESSIVE MEDIUM RESERVATIONS

RELATED APPLICATIONS

This application claims the priority benefit of U.S. Provisional Application No. 62/898,385 filed Sep. 10, 2019 and U.S. Provisional Application No. 62/916,061 filed Oct. 16, 2019, each of which is incorporated herein by reference in its entirety.

TECHNICAL FIELD

The subject matter relates to the field of wireless communications. More specifically, but not by way of limitation, the subject matter discloses techniques for detecting and mitigating aggressive reservations of a wireless communication medium.

BACKGROUND

With the proliferation of the Internet of Things (IoT), the number of networks, wireless devices, and network traffic (e.g., in the 2.4 GHz and 5 Ghz frequency bands) is steadily increasing. These increases can harm network performance, for example, by causing decreased throughput and increased latency, among wireless devices operating within geographical locations.

BRIEF DESCRIPTION OF THE DRAWINGS

Some embodiments are illustrated by way of example and not limitation in the figures of the accompanying drawings in which.

DETAILED DESCRIPTION

Figure 1:
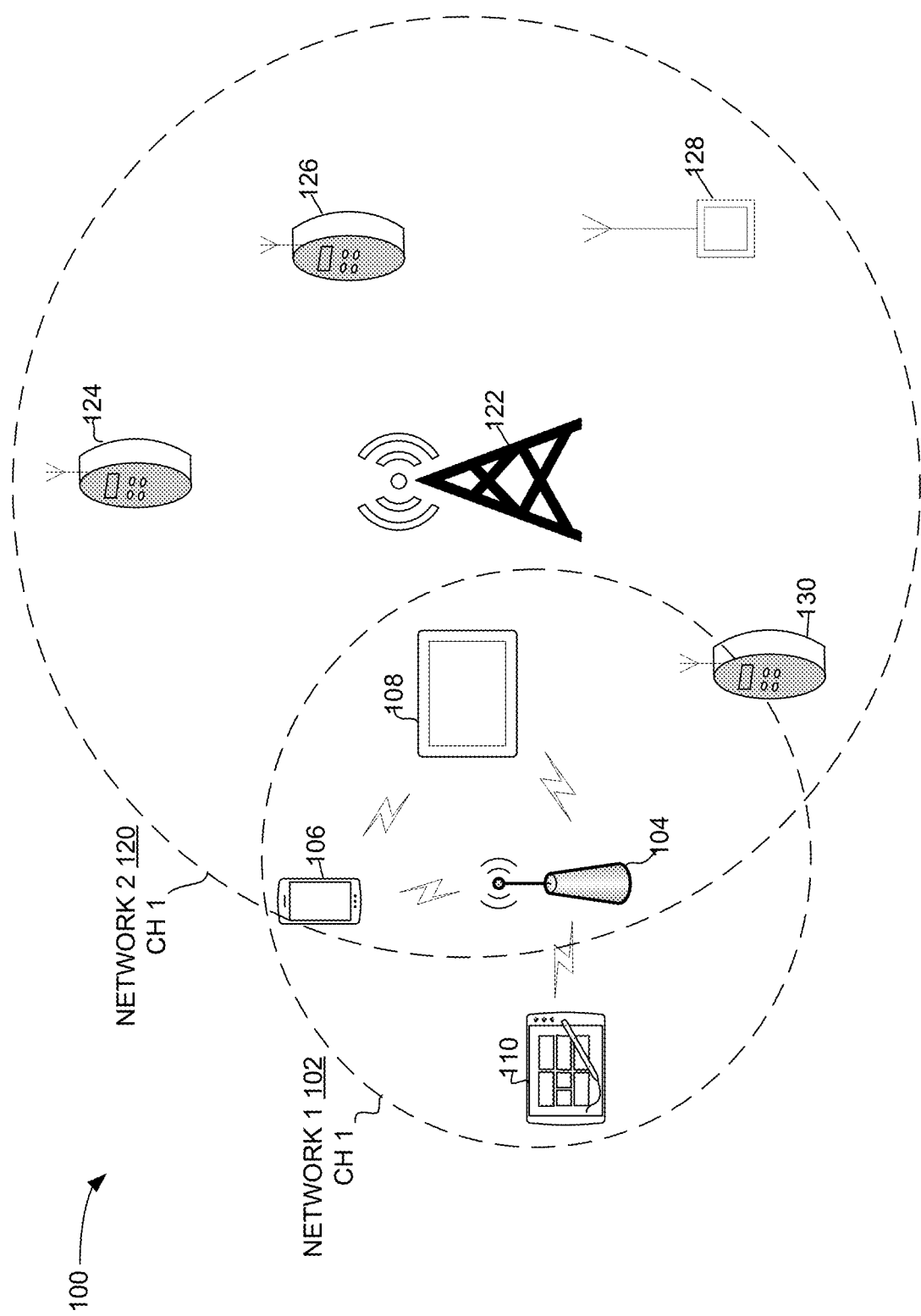
FIG. 1 is a network diagram illustrating overlapping networks, in accordance with embodiments.

Devices, systems, and methods for mitigating aggressive medium reservations are described. In the following description, for purposes of explanation, numerous examples and embodiments are set forth in order to provide a thorough understanding of the claimed subject matter. It will be evident to one skilled in the art that the claimed subject matter may be practiced in other embodiments. Some embodiments are now briefly introduced and then discussed in more detail along with other embodiments beginning with FIG. 1.

Devices that communicate using IEEE 802.11 wireless protocols but operate in different networks may share access to the same channel. To minimize co-channel interference, wireless devices contend to use the channel according to carrier sense multiple access with collision avoidance (CSMA-CA) protocol. A network channel refers to a portion of the network medium used for communication (e.g., a frequency band).

The CSMA/CA protocol utilizes carrier sensing as a line of defense to avoid multiple wireless devices transmitting on the same channel at the same time. Carrier sensing detects whether a channel is idle or busy and includes physical carrier sensing and/or virtual carrier sensing. While physical carrier sensing detects whether the channel is busy due to a current frame, virtual carrier sensing detects whether the channel is busy or reserved for future frames to be transmitted immediately following the current frame.

Virtual carrier sensing allows wireless devices to reserve the channel for frames it intends to communicate. The reservation duration may be carried in the 802.11 media access control (MAC) header duration field, which is part of the MAC protocol data unit (MPDU) exchanged between MAC entities (e.g., of wireless devices). The duration value in the MAC header indicates the time required to complete the transmission of frames, including interframe spacing, after the current frame (e.g., the frame in which the duration value resides). In embodiments, the duration value represents one or more interframe spacings (e.g., short interframe spacing (SIFS)), and the time in microseconds for the intended recipient to communicate a one or more frames with the sender. Wireless devices that are able to decode the 802.11 MAC header extract the duration field value and save it as a network allocation vector (NAV) value to mark the medium as busy for the amount of time specified (e.g., in microseconds). The wireless device then counts down from the initial NAV value and may consider the channel to be busy or reserved for as long as the NAV value is non-zero.

Some wireless devices (e.g., stations, APs) misuse the duration field in 802.11 MAC headers to aggressively reserve the channel and delay access by other wireless devices sharing the channel. Aggressive channel reservations may include standard compliant and/or standard non-compliant (e.g., ≥transmit opportunity (TXOP) max for each access category, in milliseconds) channel reservations durations that "hog" the medium for the wireless device's own network transmissions. These aggressive reservations, when decoded and obeyed by one or more wireless devices in neighboring networks, can cause those wireless devices to suffer poor network performance, especially when it causes delay of latency critical audio, voice, or video data.

Once the channel is determined to be free through carrier sensing, the processing continues with collision avoidance. In collision avoidance, the wireless device can wait for an interframe space delay that depends on the type of frame that the wireless device wishes to send. For example, a higher priority frame such as an ACK frame can wait for a SIFS while a lower priority data frame can wait for a distributed coordination function (DCF) interframe space (DIFS). After the interframe space delay, the wireless device can wait for a backoff period that is based on a contention window before it may transmit a frame on the medium. A contention window is a range of slots from which the wireless device randomly selects a back off value. The randomly selected backoff value determines how long (e.g., in slots) the channel should be idle before the wireless device can transmit its frame. The range of the contention window can be adjusted depending on access categories of data being transmitted.

Contention delay can be a significant factor affecting wireless local area network (WLAN) performance. Conventional wireless devices do not employ any techniques to proactively identify wireless devices practicing aggressive medium reservation that unfairly causes other networks to suffer service interruptions. Embodiments described herein detect patterns of medium reservations by a first wireless device, for example by detecting that the first wireless device has indicated a reservation duration that meets or exceeds a threshold duration value. Responsive to detecting the pattern of medium reservations, embodiments provide a mitigation operation to prevent a second wireless device from yielding the medium to the first wireless device that indicated the reservation duration. In embodiments, the second wireless device may then communicate via the medium during a time period that the medium is reserved by the wireless device.

Detecting the pattern of medium reservations may include analyzing various reservation attributes, which may include without limitation, reservation durations, medium idle periods, intervals between suspect frames, number of suspect frames, suspect frame source and/or recipients. In embodiments, detecting patterns of medium reservations may include comparing reservation attributes to one another and/or to reservation threshold values.

Mitigation operations may include clearing a local NAV value and then transmitting a mitigation signal to a remote wireless device. In an embodiment, the mitigation signal may cause the remote wireless device to switch to communicating on a different channel. In another embodiment, the mitigation signal includes a frame transmitted at a selected time, power, length, direction, and/or frequency (e.g., using transmit beamforming or narrowband transmission) in order to interfere with the remote wireless device's ability to decode frames (e.g., reservations) sent by the first wireless device. In other embodiments, the mitigation signal may be a WLAN frame that causes the remote wireless device to clear its own NAV such as a CFend frame or a vendor specific information element with instructions to ignore reservations sent by the first wireless device. Thus, rather than suffering from service interruptions (e.g., often without knowing the cause), wireless devices using the techniques described herein can detect the presence of medium hoggers and provide an appropriate mitigation operation so that traffic can proceed during periods in which traffic would have conventionally been delayed.

The detailed description below includes references to the accompanying drawings, which form a part of the detailed description. The drawings show illustrations in accordance with embodiments. These embodiments, which are also referred to herein as "examples," are described in enough detail to enable those skilled in the art to practice embodiments of the claimed subject matter. The embodiments may be combined, other embodiments may be utilized, or structural, logical, and electrical changes may be made without departing from the scope of what is claimed. The following detailed description is, therefore, not to be taken in a limiting sense, and the scope is defined by the appended claims and their equivalents.

FIG. 1 is a network diagram illustrating overlapping networks 100, in accordance with embodiments. In embodiments, network 1 102 and network 2 120 are each wireless local WLANs that can utilize 802.11 based communication protocols to communicate among its wireless devices over a common channel (e.g. channel 1). Although embodiments are described with respect to a WLAN channel within the 2.4 GHz frequency band, it will be noted that the techniques described herein are equally applicable to any channels within the 5 GHz and 6 GHz frequency bands or any other wireless communication delayed by aggressive medium reservations.

Network 1 102 is shown to include a wireless access point 104 (e.g., AP) wirelessly coupled to wireless devices 106, 108, and 110 (e.g., STAs). The access point 104 may be a hardware access point, or a software enabled access point (e.g., a SoftAP). Wireless devices 106, 108, and 110 may include without limitation mobile phones, tablets, rear seat entertainment systems, personal computers, Internet of Things (IoT) devices, and the like. In embodiments, network 1 102 is a mobile network (e.g., within an automobile, discussed in more detail with respect to FIG. 10). A mobile network includes a network of two or more wireless devices, where at least one of the wireless devices can move among geographical locations. In some embodiments (e.g., in a vehicle), more than one of the wireless devices (e.g., including the AP) may move, together or separately, among geographical locations.

Network 2 120 is shown to include a base station 122 coupled to wireless devices 124, 126, 128, and 130. In embodiments, base station 122 communicates with network 2 120 wireless devices using 802.11 based frames that are decodable, at least part, by the network 1 102 wireless devices that are shown to be within the range of the base station 122. In embodiments, the base station 122 uses the duration field of 802.11 MAC headers in a way that aggressively reserves (e.g., "hogs") for network 2 120 the channel being used for communication in both network 1 and network 2. These aggressive reservations, when decoded by network 1 102 wireless devices causes contention delay that results in poor network performance in network 1 102.

When network 1 102 is experiencing service interruptions, it can be difficult to identify the cause of the performance degradation. Various factors can impact the condition of wireless communication channels being used for communication in the 2.4 GHz and/or 5 Ghz frequency bands. Channel congestion and channel interference can increase communication interruptions experienced by wireless devices operating within the same vicinity. Channel congestion occurs when bandwidth associated with a node and/or a link is insufficient and network data traffic exceeds capacity, deteriorating network service quality. For example, network channel congestion may result in queuing delay, frame or data packet loss, and the blocking of new connections.

Channel interference may include adjacent and/or co-channel interference. For example, interfering radio frequency (RF) signals in an adjacent channel of an overlapping frequency spectrum (e.g., WLAN, BT, and ZB in 2.4 GHz range) and/or in an adjacent frequency spectrum (e.g., cellular such as Long-Term Evolution (LTE) band 7 and band 40) relative to the wanted RF signals can cause frequency, intermodulation and/or harmonic interference. Since decoding errors can hinder successful re-assembly of packets encoded in the wanted RF signals, these interfering RF signals can significantly increase packet loss.

Co-channel interference caused by contention delay can cause significant decreases in throughput and/or increases in latency. The inventors of the subject matter described herein have discovered techniques for detecting patterns of medium reservations that result in degraded network performance and various measures to mitigate the degradation. Examples of aggressive channel reservation patterns are discussed with respect to FIG. 2

Figure 2:
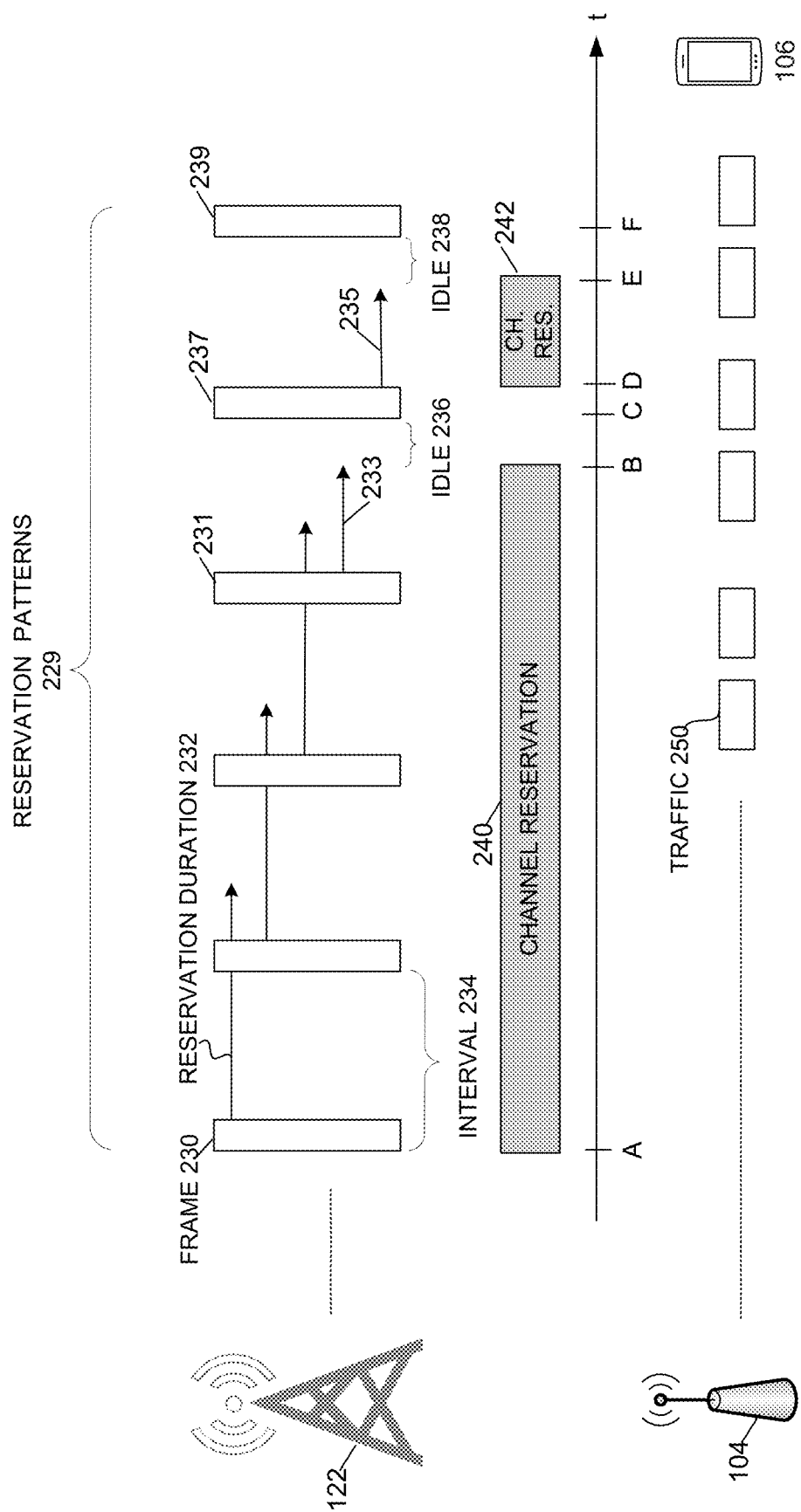
FIG. 2 is a timing diagram illustrating medium reservation patterns, in accordance with embodiments.

FIG. 2 is a timing diagram illustrating medium reservation patterns, in accordance with embodiments. The base station 122 (e.g., or another network 2 120 node) may reserve the medium or exhibit one or more patterns of medium reservation in a way that can cause contention delay in the access point 104 (e.g., or another network 1 102 node).

FIG. 2 shows a series of frames (e.g., including frames 230, 231, and 239) transmitted at intervals (e.g., the interval 234) by the base station 122. The interval between one pair of frames may be the same or different from the interval between another pair of the frames. Each frame includes a reservation duration (e.g., including the reservation durations 232, 233, and 235) represented by the length of an arrow. A reservation duration represents the amount of time a wireless device (e.g., the base station 122) claims that the channel needs to be free to complete a communication process. As can be seen, reservation durations may vary among the reservation signals.

To the access point 104, as a recipient of the base station 122 frames between time A and time B (e.g., starting with frame 230 and ending with frame 231), the channel appears to be busy and reserved between times A and B (e.g., channel reservation 240) because adjacent reservation durations indicated in consecutive frames within that period overlap in time until the last reservation duration 233 expires at time B. Between time B and time C, the channel is not reserved by a base station 122 frame and the access point 104 may consider the channel to be idle 236 (e.g., if energy levels on the medium are sufficiently low) until the access point 104 receives the next frame 237 at time C. The channel appears to be reserved by the base station 122 at time D until time E (e.g., channel reservation 242) when the reservation duration 235 expires, at which time the channel may be considered idle 238 until the next frame 239 appears at time F.

Embodiments described herein recognize various patterns of channel reservations by a wireless device that are harmful to network performance. As will be discussed in more detail below, reservation patterns 229 may be detected based on a combination of attributes including, without limitation, the sender address, the intended recipient address, frame type, number of frames, repetition intervals between frames, reservation durations, length of channel reservation, relationship between the repetition interval and reservation duration, idle time, relationship between idle time and repetition interval, and/or amount of channel reservation over a period of time (e.g. a sum of channel reservation durations).

Once a pattern of channel reservation has been detected, various mitigation operations may be employed. FIG. 2 shows, as one example result of mitigation, the access point 104 communicating traffic 250 on the channel with the wireless device 106 during periods that the access point 104 would have conventionally yielded the channel to the base station 122 in response to channel reservations 240 and 242. An example frame format that may be used in a channel reservation and/or in a channel mitigation processes is described with respect to FIG. 3.

Figure 3:
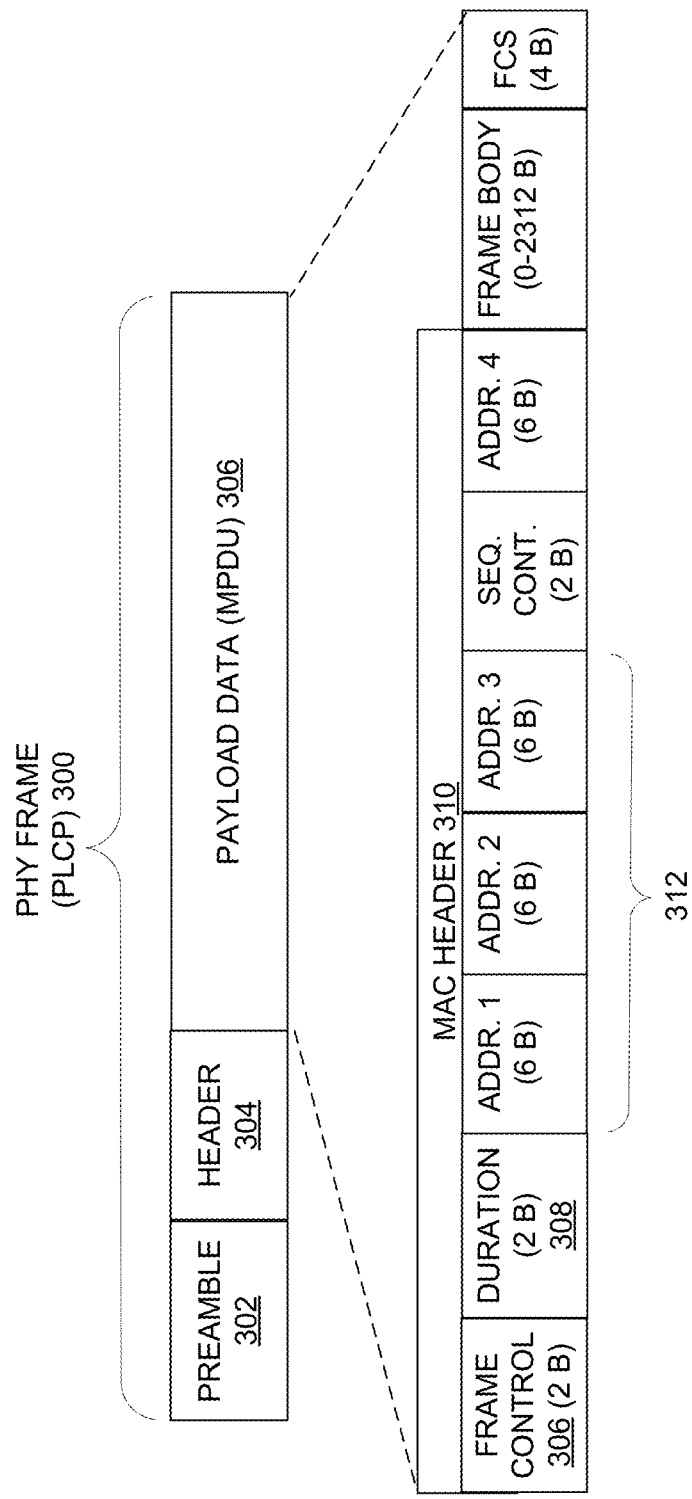
FIG. 3 is a PHY frame diagram, in accordance with embodiments.

FIG. 3 is a PHY frame 300 diagram, in accordance with embodiments. In embodiments, the PHY frame 300 is in accordance with the physical layer convergence protocol (PLCP). The PHY frame is shown to include a preamble 302, a header 304, and payload data 306. The payload data 306 of the PHY frame 300 is shown to include a MAC header 310 including various fields that may be used to detect reservation patterns. For example, the frame control field 306 may indicate, among other things, the protocol version and frame type/subtype, the duration field 308 may indicate the reservation duration (e.g., in microseconds), the address fields 312 may indicate the MAC addresses of the receiver(s) and the transmitter, respectively.

MAC frames used to reserve a channel may be management frames, control frames, data frames or a combination of frame types or subtypes. In one embodiment, the base station 122 uses action no ack (NACK) subtype, management frames for channel reservation (e.g., 240). As will be discussed in more detail below, MAC frames may also be used by a wireless device to mitigate aggressive channel reservations. For example, the access point 104 may broadcast or unicast a CFend control frames to cause another network 1 102 wireless device (e.g., 108) to clear its NAV so that it will be free to communicate on the channel. A wireless device that can detect and mitigate patterns of channel reservations is discussed with respect to FIG. 4.

Figure 4:
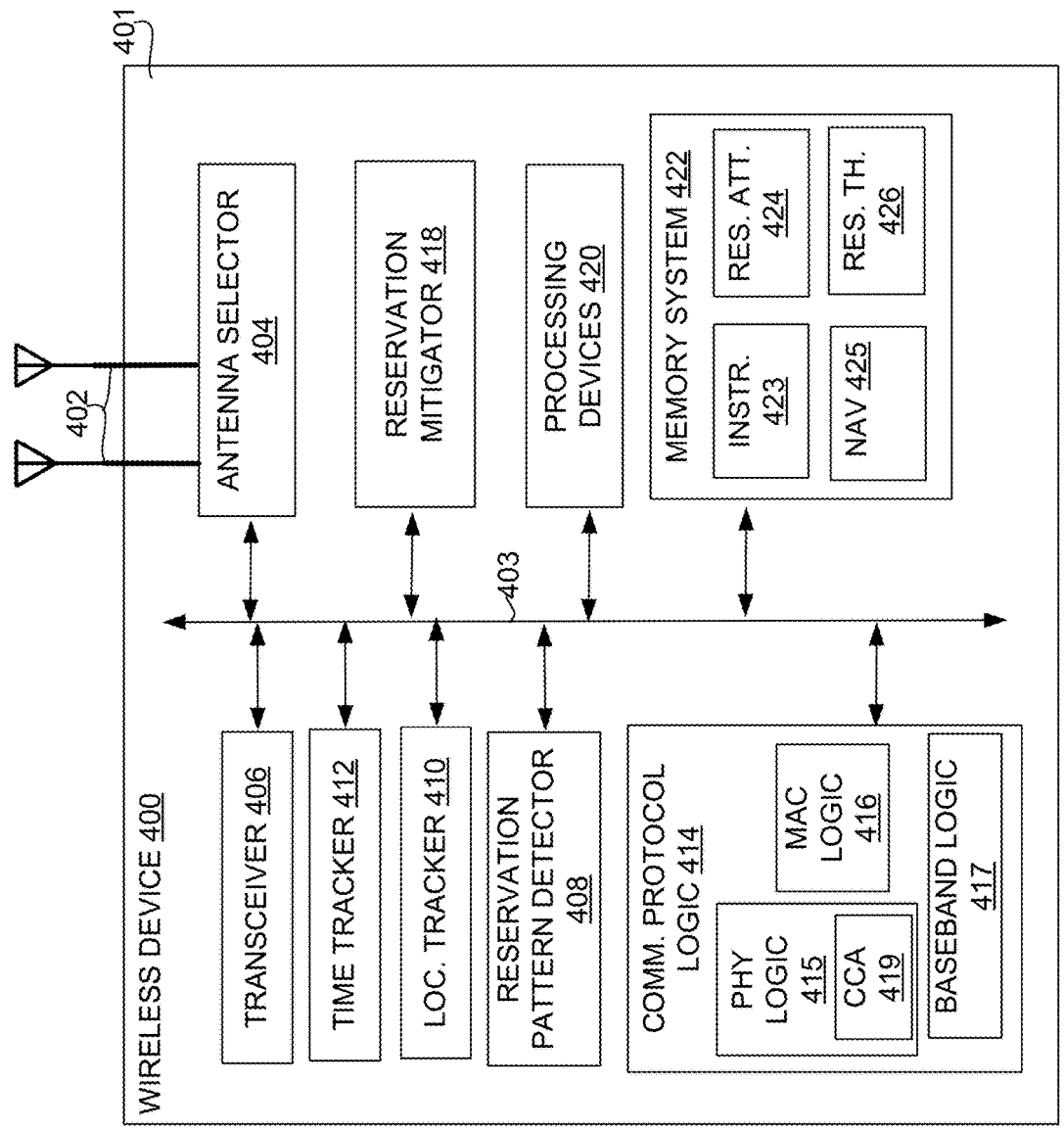
FIG. 4 is a block diagram illustrating a wireless device, in accordance with embodiments.

FIG. 4 is a block diagram illustrating a wireless device 400, in accordance with embodiments. All or portions of the wireless device 400 may be implemented in one or more of the access point 104 (e.g., or other network 1 102 devices) of FIG. 1 to detect and/or mitigate patterns of channel reservations by the base station 122 (e.g., or other network 2 120 devices) of FIG. 1.

The wireless device 400 may be disposed on a substrate 401 such as a printed circuit board (PCB). The bus system 403 may include inter-chip busses, intra-chip busses, coexistence busses, or any other communication lines that connect the circuits and/or logic blocks, which may be disposed on an IC chip or discrete IC chips.

In embodiments, the processing devices 420 are used to implement wireless device 400 operations utilizing instructions 423 (e.g., firmware or microcode) and/or data structures organized within the memory system 422. Although shown as single blocks, processing devices 420 and memory systems 422 may include multiple shared or dedicated resources distributed among the various blocks of the wireless device 400 to implement all or a part of one or more of the various blocks. Example processing devices 420 and memory systems 422 are described in more detail with respect to FIG. 11.

Wireless device 400 may include or be coupled to antennas 402 through antenna selector 404, which may include any selection logic (e.g., hardware, software, or combination) known in the art. When the antenna selector 404 selects an antenna, it couples the selected antenna to the transceiver 406 for RF signal reception and transmission. In embodiments, each antenna 402 can represent one or more antennas. For example, in some embodiments, the antenna selector 404 (e.g., operating as switch circuitry) may couple the wireless device 400 to one or more antenna arrays (e.g., a phased array) and/or antenna clusters including any number of antennae (e.g., six or eight) exclusively paired with or shared among communication protocol logic 414.

The transceiver 406 facilitates transmitting and receiving RF signals according to one or more communication protocols. In embodiments, when operating as a receiver, the transceiver 406 processes received RF signals in the analog domain, digitizes them, and demodulates corresponding digital data to provide a decoded sequence of 1s and 0s to the communication protocol logic 414 for further processing (e.g., packet processing) by the communication protocol logic 414. When operating as a transmitter, the transceiver 406 generally performs the operations in reverse, receiving a sequence of 1s and 0s from the communication protocol logic 414, modulating the signal, and outputting an analog signal for transmission by one or more of the antennas 402.

Location tracker 410 and time tracker 412 are to track geographical locations and time values, respectively, associated with the wireless device 400. In embodiments, location tracker 410 includes global positioning system circuitry (not shown) to detect GPS coordinates. Alternatively or additionally, location tracker 410 may use triangulation techniques based on signals from access points or other location finding techniques known in the art to determine location of the wireless device 400. Time tracker 412 may, for example, utilize a system clock circuitry (not shown) to track time or access remotely generated time values.

The communication protocol logic 414 may include the instructions and hardware to support communication protocols defined by one or more communication protocol standards (e.g., according to WLAN, BT, LTE, and/or ZB communication protocols). The PHY logic 415 may include dedicated circuitry and/or processor executed instructions to implement all or portions of electrical and physical specifications of a communication protocol and defines the relationship between the wireless device and the transmission medium (e.g., all or portions of the physical layer of the OSI reference model). For example, the PHY logic 415 may establish and terminate connections, provide contention resolution and flow control, and provide modulation, demodulation, and/or conversion between digital data and corresponding wirelessly communicated signals. The PHY logic may use techniques known in the art to detect an RSSI value associated with an RF signal observed at an antenna during reception of a packet's (e.g., or frame's) preamble (e.g., the preamble 302 of FIG. 3). The PHY logic may encode the detected RSSI value in a header of the same packet and/or store the RSSI value in the memory system 422.

In embodiments, the PHY logic 415 includes clear channel assessment (CCA) logic 419 that measures the energy of radio frequency signals received through the transceiver 406 to provide physical carrier sensing. To implement physical carrier sensing CCA logic may detect the presence or absence of 802.11 frames (e.g., based on signal strength). In an embodiment, an incoming PHY frame whose PLCP header can be successfully decoded (e.g., a signal detect threshold level of −82 dB) by the PHY logic will cause the CCA logic to report the medium as busy for the time calculated for the frame transmission to complete. To implement physical carrier sensing, the CCA logic may also measure the power of RF energy in the channel (e.g., ambient energy, interference sources, and unidentifiable Wi-Fi transmissions). If the energy level is greater than an energy detect threshold level (e.g., −62 db) the channel is determined to be busy. It will be noted that any signal detect threshold level and/or energy detect threshold level that is suitable for a particular design or performance targets may be used without departing from the claimed subject matter. If the CCA logic does not determine that the channel is busy, the CCA logic may determine that the channel is idle (e.g., see idle periods 236 and 238 in FIG. 2).

The MAC logic 416 may include dedicated circuitry and/or processor executed instructions (e.g., control logic) to implement all or portions of the functional and procedural means to transfer data between network entities (e.g., all or portions of the data link layer of the OSI reference model). In embodiments, MAC logic 416 may work in conjunction with PHY logic 415 and antennas 402 to focus energy toward a receiver according to 802.11 transmit beamforming techniques. MAC logic 416 may also facilitate narrowband transmissions to receivers within a selected channel to intensify frame power at the receiver. In embodiments, the MAC logic 416 may inspect MAC frame fields for information that can be used by the wireless device to implement virtual carrier sensing and to detect and mitigate aggressive medium reservations. MAC frames used as reservation signals may be management frames, control frames, data frames or a combination of frame types or subtypes. The MAC logic 416 may parse the MAC header to determine frame type, the MAC addresses of the base station (e.g., sender), and the destination (e.g., broadcast), and reservation duration (e.g., in microseconds) and store these values in memory as attributes 424 for use by the reservation pattern detector 408 and/or the reservation mitigator 418, discussed further below.

To implement virtual carrier sensing, the MAC logic 416 may extract the duration field value from MAC headers and save it as a NAV value 425 in the memory system 422 to mark the medium as busy for the amount of time specified (e.g., in microseconds) in the duration field. The MAC logic 416 may subsequently count down the NAV value and consider the channel to be busy or reserved for as long as the NAV value is non-zero. The MAC logic may also update the NAV value, or clear the NAV value stored in the memory system 422 responsive to subsequent frames and/or mitigation signals (e.g., discussed below).

In embodiments, the wireless device 400 may be 802.11ax compatible and associated with a basic service set (BSS) color. In such embodiments, the wireless device 400 can encode and decode BSS color information at both the PHY layer and the MAC sublayers. For example, the PHY logic 415 may encode and/or decode BSS color information in the SIG-A field of the 802.11ax PHY header. The MAC logic 416 may encode and/or decode BSS color information in the HE operation information element of MAC management frames.

The communication protocol logic 414 may also include baseband logic 417 that includes dedicated circuitry and/or processor executed instructions to manage physical channels and links and other services like error correction, data whitening, hop selection and security according to BT communication protocol standards. The baseband logic 417 may include a link controller that works with a BT link manager (not shown) in upper BT protocol layers to carry out link level routines like link connection and power control. The baseband logic 417 may also manage asynchronous and synchronous links, handle packets and do paging and inquiry to access and inquire BT devices in the area.

In embodiments, collaborative coexistence hardware mechanisms and algorithms enable communication subsystems to operate concurrently and/or simultaneously. For example, the wireless device 400 may be included on a system on a chip that includes BT communication resources and/or ZB communication resources coupled via coexistence interface(s) to WLAN communication resources.

Collaborative coexistence techniques provide a methodology by which communication resources for multiple communication protocols can be collocated on a device (e.g., a small form-factor device). Coexistence solutions can be implemented at the chip level, the board level, the software level (e.g., firmware), and/or through antennas. In an embodiment, collaborative coexistence between WLAN, BT, and/or ZB subsystems may be implemented by Packet Traffic Arbitration (PTA) logic (not shown) using PTA's prioritization approaches between data types and applications and/or other arbitration algorithms to pursue optimum performance for the particular circumstances and design constraints of a multi-network communication system. Through PTA embodiments, overall quality for simultaneous voice, video, and data transmission on an embedded system can be achieved. In some embodiments, reservation patterns detected according to the embodiments described herein may be shared as part of a coexistence operation for communication by one or more of the multiple communication resources supported by the wireless device 400.

The reservation pattern detector 408 is to detect channel reservations by another wireless device and designate that the wireless device as an offender based on detected reservation patterns. In embodiments, the reservation pattern detector 408 retrieves and uses attributes associated with reservations (e.g., MAC frames) to detect aggressive reservations. The reservation pattern detector 408 may be implemented by dedicated hardware and/or by processing instructions 423, and although shown as being a separate block, the reservation pattern detector 408 may be implemented in whole or in part by the transceiver 406, communication protocol logic 414, the reservation mitigator 418, and/or by processing instructions 423 stored in the memory system 422.

In some embodiments, the reservation pattern detector 408 may include analog and/or digital logic and/or measurement circuitry to determine attributes associated with reservation signals. The reservation pattern detector 408 may obtain reservation attributes by listening to or scanning RF signals and/or sniffing packets broadcast on the channel. Reservation pattern detector 408 may also sniff and/or count packets being communicated on a channel to obtain reservation signal attributes. For example, the reservation pattern detector 408 may retrieve from the communication protocol logic 414 or the memory system 422 (e.g., attributes 424) reservation duration values, transmit opportunity values, SSID to which the sender and receiver belong, and/or channel identifiers associated with reservations. The reservation pattern detector 408 may also utilize counter logic (not shown) to count a number of frames, timing circuitry (not shown) to calculate repetition intervals, and various reservation threshold values 426 stored in the memory system 422 to recognize aggressive reservation patterns.

In embodiments, the reservation pattern detector 408 may be triggered to initiate reservation pattern detection based on various events or conditions. Such events or conditions may be received from a remote device and/or stored as an array in the memory system 422. For example, the reservation pattern detector 408 may begin to detect reservation patterns in response to proximity of the wireless device 400 to a particular geographical location detected by the location tracker 410, a detected level of congestion or interference (e.g., contention delay) and/or a particular time of day detected by the time tracker 412.

The reservation mitigator 418 is to mitigate contention delay caused by aggressive channel reservations. Once a wireless device (e.g., the base station 122) has been designated as an offender, the reservation mitigator 418 may provide one or more of a variety of mitigation operations for the wireless device 400 itself or for another wireless device in the same network. For example, the mitigation operation may cause the wireless device 400 or signal another wireless device in the same network to ignore certain channel reservations asserted by an out of network device (e.g., by clearing a NAV value associated with channel reservations). The reservation mitigator 418 may be implemented by dedicated hardware and/or by processing instructions 423. The mitigation operation may include the reservation mitigator 418 transmitting a mitigation signal (e.g., a frame) at a selected time, power, length, direction, and/or frequency that interferes with the other wireless device's reception of a subsequent frame (e.g., a reservation frame).

FIGS. 5-9 illustrate example methods of detecting and/or mitigating channel reservations. Each example method can be performed by processing logic comprising hardware (circuitry, dedicated logic, etc.), software (such as is run on a general-purpose computing system or a dedicated machine), firmware (embedded software), or any combination thereof. In various embodiments, the methods may be performed as shown and described with respect to the wireless device 400 of FIG. 4.

Figure 5:
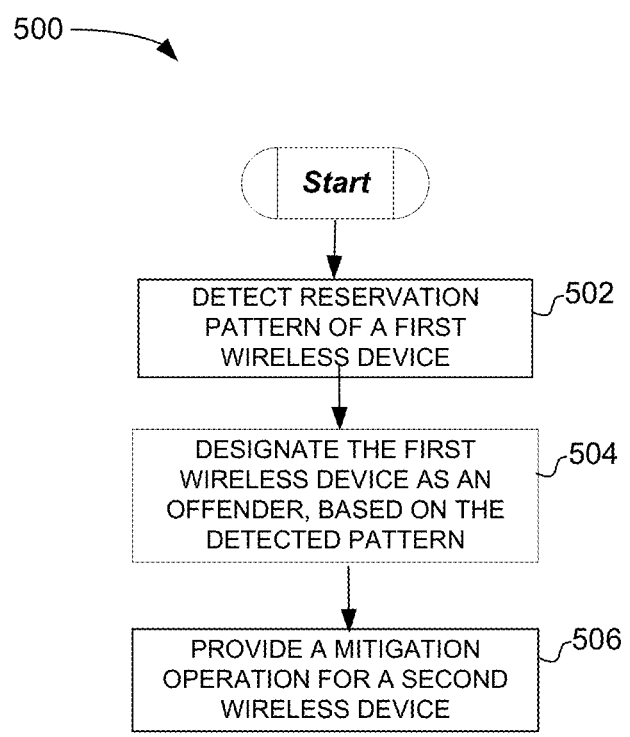
FIG. 5 is a flow diagram outlining a method of detecting and mitigating channel reservations, in accordance with embodiments.

FIG. 5 is a flow diagram outlining a method 500 of detecting and mitigating channel reservations, in accordance with an embodiment. At block 502, the reservation pattern detector 408 detects a reservation pattern 129 of a wireless device. At block 504, the reservation pattern detector 408, designates the wireless device as an offender, based on the detected reservation pattern. Further operations of the reservation pattern detector 408 are discussed with respect to FIGS. 6-8. At block 506, the reservation mitigator 418, provides a mitigation operation for a second wireless device. Further operations of the reservation mitigator 418 are discussed with respect to FIGS. 8 and 9.

Figure 6:
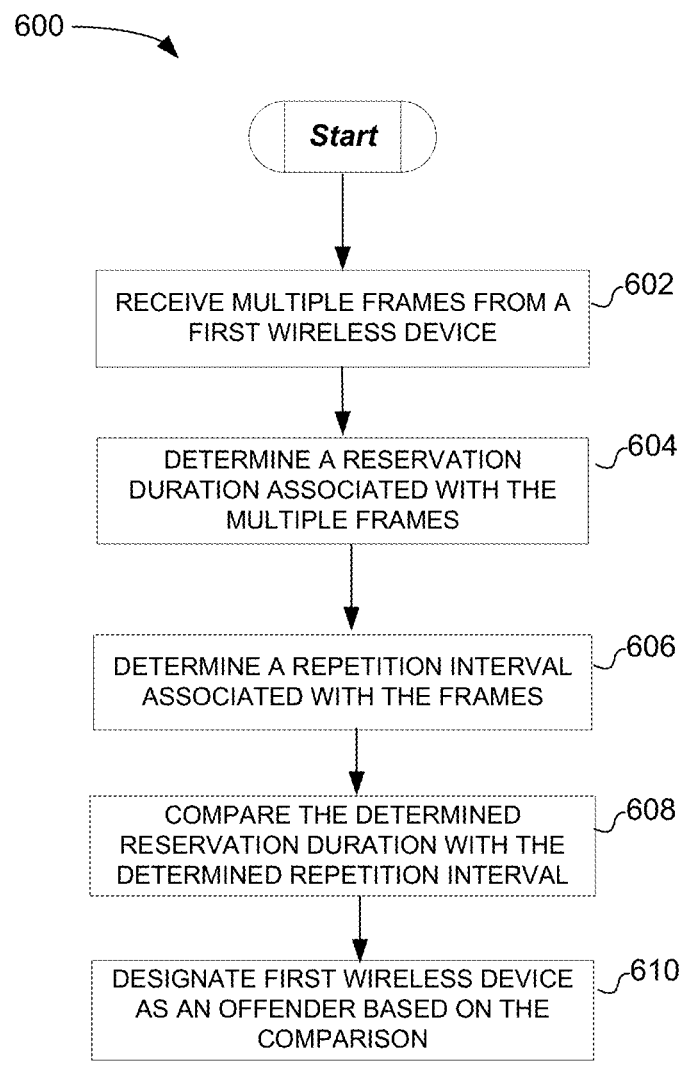
FIG. 6 is a flow diagram illustrating a method of designating a wireless device as an offender, in accordance with embodiments.

FIG. 6 is a flow diagram illustrating a method 600 of designating a wireless device as an offender, in accordance with embodiments. At block 602, the wireless device 400 (e.g., the access point 104) receives multiple frames (e.g., in FIG. 2, beginning with the frame 230 and ending with the frame 231) from another wireless device (e.g., the base station 122). At block 604, the reservation pattern detector 408 determines a reservation duration (e.g., reservation duration 232) associated with the multiple frames. It will be noted that the reservation duration in individual frames may be the same or different from one another. For example, the repetition duration may be a function (e.g., an average) of reservation durations in the multiple frames. At block 606, the reservation pattern detector 408 determines a repetition interval (e.g., interval 234) associated with the multiple frames. The interval between individual frames may be the same or different from one another, and in some embodiments, the repetition interval is function (e.g., an average) of intervals between pairs of the multiple frames.

At block 608, the reservation pattern detector 408 compares the determined reservation duration with the determined repetition interval. At block 610, the reservation pattern detector 408 designates the first wireless device as an offender (e.g., a channel hogger) based on the comparison. For example, if the reservation pattern detector 408 determines that the reservation duration meets or exceeds a threshold portion of the repetition interval (e.g., a selected fraction of the interval), it may deem the sender to be a hogger. In another example, referring to FIG. 2, when the access point 104 uses its reservation pattern detector 408 to determine that the interval 234 is shorter than the reservation duration 232, the reservation pattern detector 408 may identify the base station 122 as a hogger. In some embodiments, the reservation pattern detector 408 may wait to identify the base station 122 as a hogger until the multiple frames associated with the repetition interval and the reservation duration meet or exceed a threshold number of consecutive frames. In embodiments, the reservation pattern detector 408 may set the threshold number of frames and/or the threshold portion of the interval, based on the location of the wireless device, the time of day, the day of the week, and/or the latency sensitivity of the type of traffic (e.g., voice, audio, video, or data) to be communicated on the channel.

Figure 7:
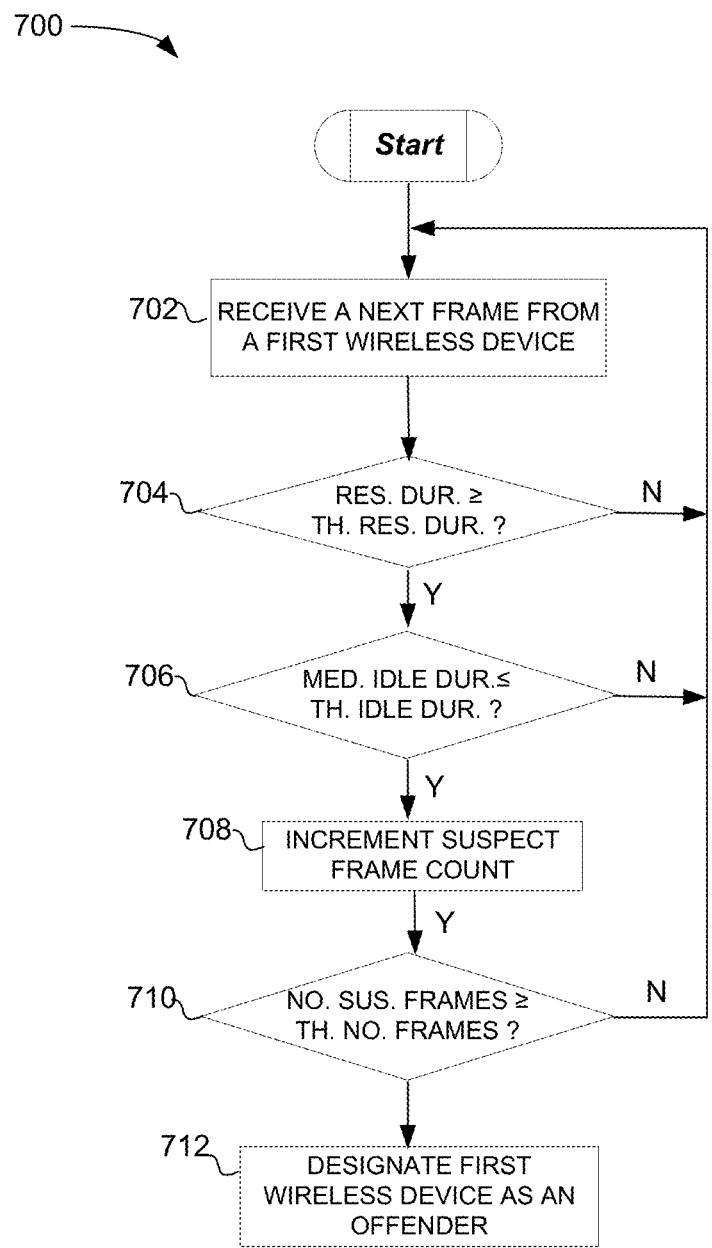
FIG. 7 is a flow diagram illustrating another method of designating a wireless device as an offender, in accordance with embodiments.

FIG. 7 is a flow diagram illustrating another method 700 of designating a wireless device as an offender, in accordance with embodiments. At block 702, the wireless device 400 (e.g., the access point 104) receives a next frame (e.g., In FIG. 2, frame 237) from another wireless device (e.g., the base station 122). At block 704, the reservation pattern detector 408 determines whether a reservation duration (e.g., reservation duration 235) of the frame meets or exceeds a threshold reservation duration. In embodiments, the threshold reservation duration is selected based on a transmit opportunity (TXOP) value that represents the amount of time the base station 122 is allotted to send frames after having won contention for the channel. If the reservation duration does not meet the threshold reservation duration, the frame is not considered to be a suspect frame and the wireless device 400 waits for a next frame at block 702. If the reservation duration does meet or exceed the threshold reservation duration, the method 700 proceeds to block 706.

At block 706, the reservation pattern detector 408 determines whether an idle duration (e.g., in FIG. 2, idle 238) is less than or equal to a threshold idle duration value. Referring again to FIG. 2, although the channel is not reserved between times E and F, the idle period 238 may be so short that the access point 104 is effectively excluded from using the channel over a period of time. Thus, the threshold idle duration value can be selected to detect a pattern of reservations that effectively causes the wireless device 400 not to contend for the channel. For example, the threshold idle duration value may be selected based on the reservation duration 235, the repetition interval 234 and/or a number of available slots within a period that the channel is idle. If the idle duration does not meet the threshold idle duration value, the frame is not considered to be a suspect frame and the wireless device 400 waits for a next frame at block 702. If the idle duration does meet or exceed the threshold idle duration value, the method 700 proceeds to block 708.

At block 708, the reservation pattern detector 408 increments a count of the number of suspect frames from the other wireless device. In FIG. 2, the access point 104 will consider the frame 237 to be a suspect frame because the detected reservation duration 235, the repetition interval 234, and the idle duration 238 are deemed to be potentially part of a pattern of aggressive channel reservations.

At block 710, the reservation pattern detector 408 determines whether the number of suspect frames is greater than or equal to a threshold number of suspect frames. If not, the wireless device 400 waits to receive subsequent frames at block 702. When the threshold number of suspect frames has been reached, the wireless device 400 proceeds to block 712 where the reservation pattern detector 408 designates the other wireless device as an offender (e.g., a channel hogger). In some embodiments, the suspect frames are consecutive frames received from the other wireless device. When the threshold number of suspect frames has been reached, the reservation pattern detector 408 considers that all of the suspect frames and their associated reservation durations, repetition intervals, and idle periods make up aggressive reservation patterns.

In embodiments, the reservation pattern detector 408 may set the threshold reservation duration, idle duration, and/or the threshold number of suspect frames, based on the location of the wireless device, the time of day, the day of the week, and/or the latency sensitivity of the type of traffic (e.g., voice, audio, video, or data) to be communicated on the channel. For example, when latency sensitive traffic is being communicated, lower threshold reservation durations and number of suspect frames may be selected compared to those selected for data traffic.

Figure 8:
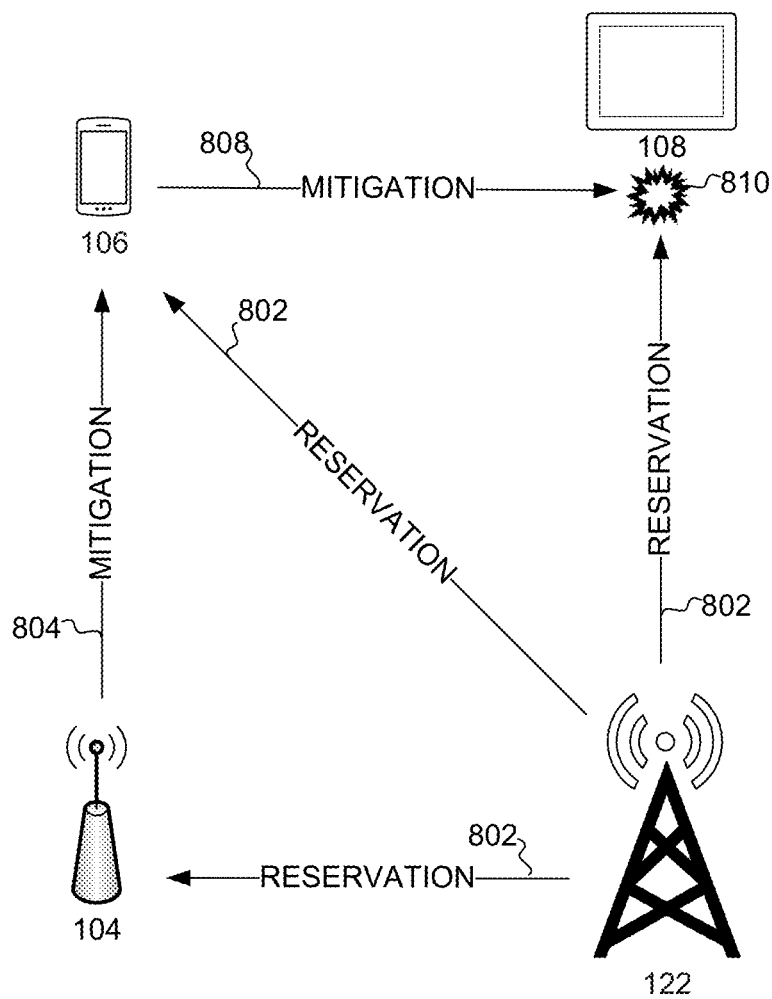
FIG. 8 is an interaction diagram illustrating wireless devices that may detect and mitigate aggressive reservations, in accordance with embodiments.

FIG. 8 is an interaction diagram illustrating wireless devices that may detect and mitigate aggressive reservations, in accordance with embodiments. FIG. 8 is shown to include the network 2 120 base station 122 sending out reservations 802 (e.g., via frames) to reserve a channel that network 1 102 is using for communication. FIG. 8 illustrates example mitigation operations that the various network 1 102 devices may conduct once the base station 122 has been identified as a hogger (e.g. an offender).

Although the access point 104 may be described in some embodiments to provide certain mitigation operations and/or mitigation signals, the other network 1 102 devices, depending on their mode of operation (e.g., STA, AP, SoftAP, P2P AGO owner) may provide the same mitigation operations and/or mitigation signals without departing from the claimed subject matter. Similarly, the access point 104 (e.g., or other network 1 102 devices) may provide mitigation operations and/or mitigation signals described to be provided by the wireless device 106.

As part of a mitigation operation, the access point 104 (e.g., or other network 1 102 device) may clear its NAV value associated with a reservation by the base station 122. With its NAV value cleared, the access point 104 (e.g., or other network 1 102 device) need not yield the channel to the base station 122. In embodiments, this mitigation operation is employed when the access point 104 (e.g., or other network 1 102 device) wants to send traffic to other network 1 102 devices.

In some embodiments, a mitigation signal 804 transmitted by the access point 104 is a frame encoded with an instruction that causes the wireless device 106 (e.g., and/or other network 1 102 devices) to switch network 1 102 communication to a channel that is different from the one being used by network 2 120.

In some embodiments, the mitigation operation includes indicating that the channel being used by both network 1 102 and network 2 120 is free so that one or more of the network 1 102 devices will not be delayed from communicating via the channel due to the designated hogger. This is shown in an example of FIG. 2 where the base station is designated as a hogger from time A to time F and the access point 104 is shown to communicate traffic 250 with the wireless device 106 during periods that the base station 122 is hogging or designated as a hogger.

In embodiments, the mitigation operation may include providing a mitigation signal to another network 1 102 device to indicate that the channel is free despite reservations by the base station 122. For example, this can be useful when the access point 104 wants to receive traffic from the wireless device 106 but the wireless device 106 is not configured to detect and mitigate hoggers as described herein. The problem occurs when the wireless device 106 finds a medium gap between hogger intervals and send a request to send (RTS) frame to the access point 104. After the access point 104 has cleared its NAV as described above, the access point 104 can respond to the with a clear to send (CTS) to indicate to the wireless device that the channel is open for communication.

In some embodiments, the mitigation signal may include a CFEnd frame sent by the access point 104 to the wireless device 106 to cause the wireless device 106 to clear its NAV value associated with the reservation 802. The CFend frame may be sent at power level selected such that network 1 102 devices receive the CFend frame but network 2 120 devices (or other neighboring networks) are less likely to receive the CFend frame. For example, the access point 104 may use detected RSSI values and transmit power associated with network 1 devices to select the power level at which to send the CFend frame.

In embodiments where the access point 104 (e.g., a SoftAP) and the wireless device 106 (e.g., station) are provided by the same vendor, the mitigation signal may include an 802.11 vendor specific information element that encodes an instruction to ignore reservations asserted from the address of the hogging base station 122 (e.g., or another hogging network 2 120 device). In this way, the mitigation signal may prevent the wireless device 106 from yielding the medium to a transmission by the base station (e.g., or other network 2 devices).

In embodiments, network 1 102 is an 802.11ax network associated with a BSS color. If the base station 122 (e.g., or other designated hogger) is not associated with a BSS color (e.g., network 2 120 is an 802.11ac network), the access point 104 may clear its own NAV and transmit one or more frames as the mitigation signal to inform the wireless device 106 (e.g., and/or other network 1 102 devices) to ignore future reservations from the address of the base station 122. If the hogging base station 122 is also an 802.11ax device but has a different BSS color, the access point 104 may conduct mitigation operations to cause network 1 102 devices to clear their NAVs and ignore subsequent reservations associated with the address of the base station 122. If the hogging base station 122 is an 802.11ax device with the same BSS color as network 1 102, the access point 102 can set a new BSS color and ignore reservations associated with BSS color of the hogging base station 122. In automotive and other networks where devices are in closer physical proximity of each other, mitigation operations used by network 1 102 devices may include RF/PHY de-sense techniques to ensure that they are tuned to receiving network 1 102 packets within a geographical region, thereby reducing the chances of receiving hogger frames/traffic sent from outside the geographical region. A method of providing a mitigation signal that acts as RF interference is described with respect to FIG. 9.

Figure 9:
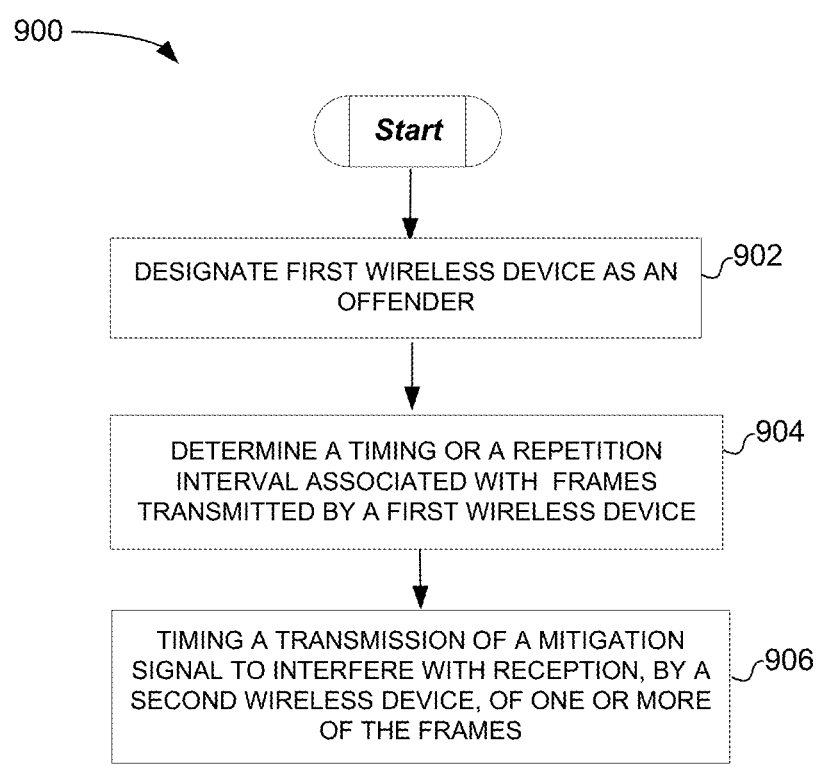
FIG. 9 is a flow diagram illustrating a method of mitigating aggressive medium reservations, in accordance with an embodiment.

FIG. 9 is a flow diagram illustrating a method 900 of mitigating aggressive medium reservations, in accordance with embodiments. At block 902, the reservation pattern detector 408 (e.g., of the wireless device 106 in FIG. 8) designates another wireless device (e.g., the base station 122) as an offender. At block 904, the reservation mitigator 418 (e.g., of the wireless device 106) determines a timing associated with frames (e.g., reservations 802 of FIG. 8) transmitted by the offending wireless device. For example, referring to FIG. 2, the reservation mitigator 418 may use an interval 234 associated with frames transmitted by the base station 122 to predict or determine when the base station 122 will transmit a subsequent frame.

At block 906, the reservation mitigator 408 times a transmission of a mitigation signal (e.g., mitigation 808 in FIG. 8) to interfere with reception, by a wireless device (e.g., the wireless device 108), of one or more of the frames (e.g., reservations 802) transmitted by the offending wireless device (e.g., the base station 122). The interference is indicated by the explosion icon 810 is FIG. 8. This scheme can work especially well when network 1 102 devices are located closer to one another (e.g., in an automotive network) than any network 2 120 device (e.g., located on lamp-post or gas station roof-top).

For example, knowing that the base station 122 (e.g., the hogger) will send back-to-back reservation extensions before the expiry of a first reservation duration, the wireless device 106 having cleared its own NAV as described above, can send an 802.11 null data frame or CTS-to-nowhere frame around the same time as the hogger transmits a reservation frame to "squash" that hogger transmission so that the wireless device 108 will not be able to successfully decode the hogger's frames—thereby eventually resulting in a clear NAV of the wireless device 108. The length of the interfering mitigation signal (e.g., any 802.11 frame) may be selected to increase the probability of interfering with the wireless device's 108 ability to decode the reservation 802. Alternatively or additionally, the wireless device 106 may utilize transmit beamforming or narrowband transmission in order to concentrate the power of the mitigation signal at the wireless device to increase the probability of interfering with the wireless device's 108 ability to decode the reservation 802.

Figure 10:
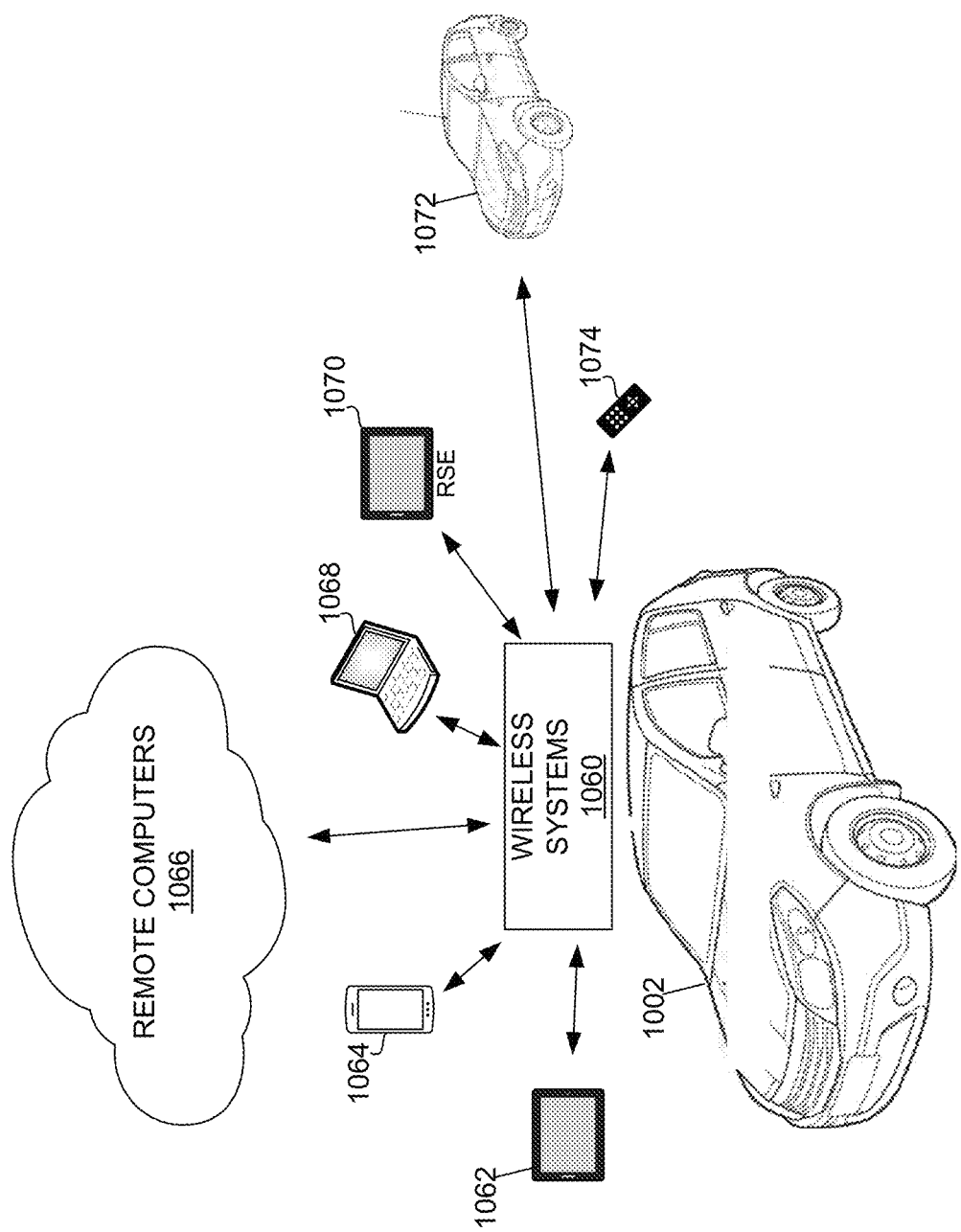
FIG. 10 is a block diagram illustrating a network within an automobile in accordance with embodiments.

FIG. 10 is a block diagram illustrating a network within an automobile, in accordance with embodiments. The wireless systems 1060 facilitate wireless communication with and among wireless devices associated with the automobile 1002. The wireless devices associated with the automobile 1002 may include, without limitation, console display 1062, mobile phone 1064, laptop computer 1068, rear seat entertainment (RSE) 1070, remote computers 1066, other automobile 1072, and remote control 1074. In embodiments, wireless systems 1060 may include an infotainment head unit capable of communicating via Wi-Fi, Bluetooth, and LTE communication protocols with one or more of the wireless devices.

Example wireless communication by and among the wireless devices facilitated by the wireless systems 1060 via Wi-Fi may include display sharing, multimedia distribution (e.g., to RSE), Internet access (e.g., tethering, external hotspots), and EV wireless charging. The wireless systems 1060 may use 802.11p for car to car communication. Example wireless communication by and among wireless devices facilitated by the wireless systems 1060 via Bluetooth may include hands free voice, media streaming, keyless entry, automated parking, tire pressure monitoring, and remote sensor controls. The wireless systems 1060 may use LTE for data connections to offload media services and for OEM over the air updates. It will be noted that communication for the various functionality described above may be achieved using other communication protocols without departing from the claimed subject matter. One or more of the mobile networks (e.g., automotive network) in the automobile 1002 may be susceptible to channel contention delay in a geographical location.

A mobile network within an automobile may experience channel hoggers as the automobile (e.g., and the mobile network) moves into different geographical locations. In some cases, the presence and activity of hoggers at geographical locations at different time a day can negatively impact performance of a network within the automobile.

Figure 11:
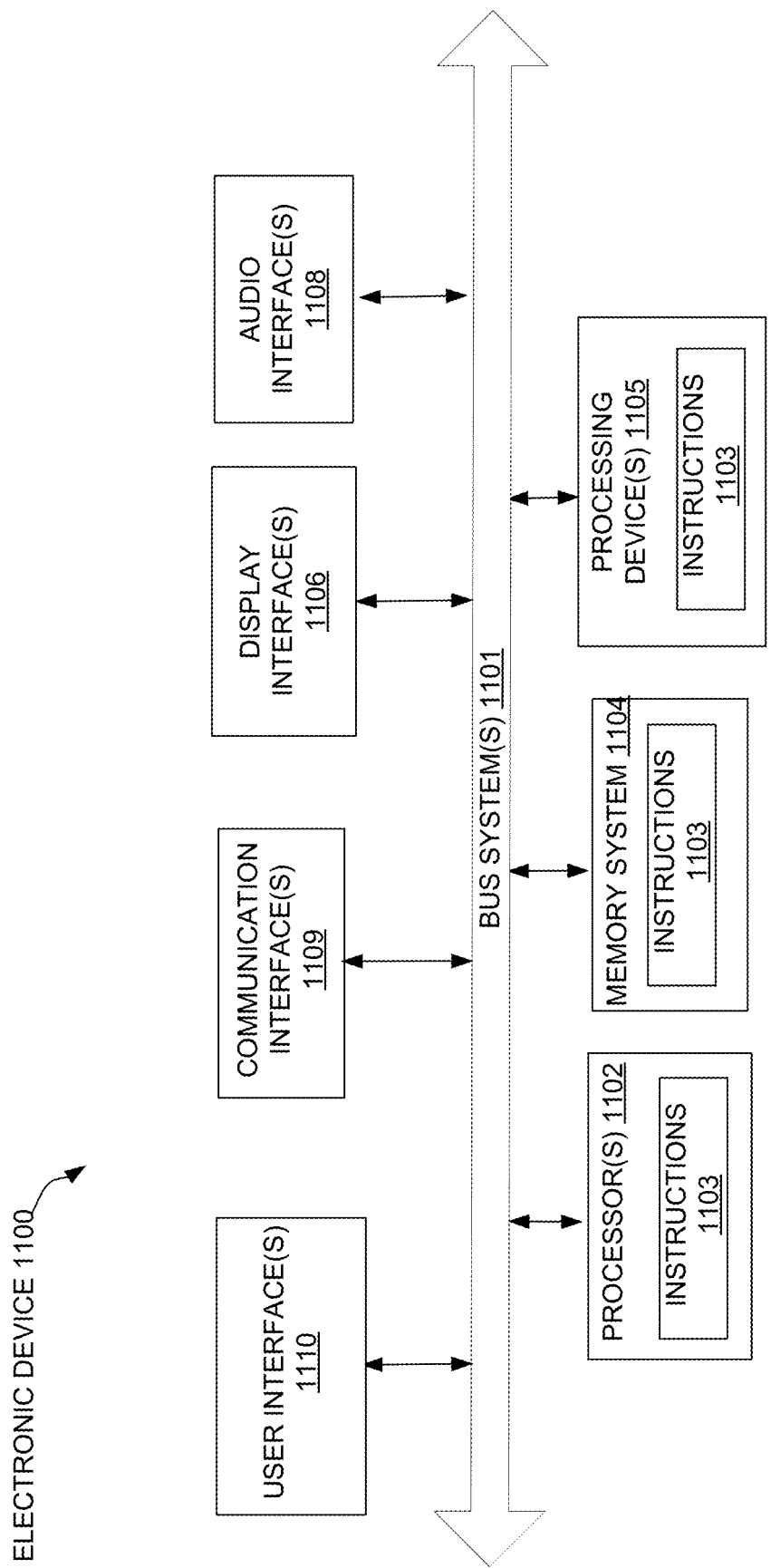
FIG. 11 is a block diagram illustrating an electronic device, in accordance with embodiments.

An electronic device that may fully or partially include and/or operate the example embodiments of the wireless device 400 of FIG. 4 is now described with respect to FIG. 11.

FIG. 11 is a block diagram illustrating an electronic device 1100, in accordance with embodiments. The electronic device 1100 may be in the form of a computer system within which sets of instructions may be executed to cause the electronic device 1100 to perform any one or more of the methodologies discussed herein. The electronic device 1100 may operate as a standalone device or may be connected (e.g., networked) to other machines. In a networked deployment, the electronic device 1100 may operate in the capacity of a server or a client machine in server-client network environment, or as a peer machine in a P2P (or distributed) network environment.

The electronic device 1100 may be an Internet of Things (IoT) device, a server computer, a client computer, a personal computer (PC), a tablet, a set-top box (STB), a VCH, a Personal Digital Assistant (PDA), a mobile telephone, a web appliance, a network router, switch or bridge, a television, speakers, a remote control, a monitor, a handheld multi-media device, a handheld video player, a handheld gaming device, or a control panel, or any other machine capable of executing a set of instructions (sequential or otherwise) that specify actions to be taken by that machine. Further, while only a single electronic device 1100 is illustrated, the term "device" shall also be taken to include any collection of machines that individually or jointly execute a set (or multiple sets) of instructions to perform any one or more of the methodologies discussed herein.

The electronic device 1100 is shown to include processor(s) 1102. In embodiments, the electronic device 1100 and/or processors(s) 1102 may include processing device(s) 1105 such as a System on a Chip processing device, developed by Cypress Semiconductor Corporation, San Jose, Calif. Alternatively, the electronic device 1100 may include one or more other processing devices known by those of ordinary skill in the art, such as a microprocessor or central processing unit, an application processor, a host controller, a controller, special-purpose processor, DSP, an application specific integrated circuit (ASIC), a field programmable gate array (FPGA), or the like. Bus system 1101 may include a communication block (not shown) to communicate with an internal or external component, such as an embedded controller or an application processor, via communication device(s) 1109 and/or bus system 1101.

Components of the electronic device 1100 may reside on a common carrier substrate such as, for example, an IC die substrate, a multi-chip module substrate, or the like. Alternatively, components of the electronic device 1100 may be one or more separate ICs and/or discrete components.

The memory system 1104 may include volatile memory and/or non-volatile memory which may communicate with one another via the bus system 1101. The memory system 1104 may include, for example, random access memory (RAM) and program flash. RAM may be static RAM (SRAM), and program flash may be a non-volatile storage, which may be used to store firmware (e.g., control algorithms executable by processor(s) 1102 to implement operations described herein). The memory system 1104 may include instructions 1103 that when executed perform the methods described herein. Portions of the memory system 1104 may be dynamically allocated to provide caching, buffering, and/or other memory based functionalities.

The memory system 1104 may include a drive unit providing a machine-readable medium on which may be stored one or more sets of instructions 1103 (e.g., software) embodying any one or more of the methodologies or functions described herein. The instructions 1103 may also reside, completely or at least partially, within the other memory devices of the memory system 1104 and/or within the processor(s) 1102 during execution thereof by the electronic device 1100, which in some embodiments, constitutes machine-readable media. The instructions 1103 may further be transmitted or received over a network via the communication device(s) 1109.

While a machine-readable medium is in some embodiments a single medium, the term "machine-readable medium" should be taken to include a single medium or multiple media (e.g., a centralized or distributed database, and/or associated caches and servers) that store the one or more sets of instructions. The term "machine-readable medium" shall also be taken to include any medium that is capable of storing or encoding a set of instructions for execution by the machine and that cause the machine to perform any one or more of the example operations described herein. The term "machine-readable medium" shall accordingly be taken to include, but not be limited to, solid-state memories, and optical and magnetic media.

The electronic device 1100 is further shown to include display interface(s) 1106 (e.g., a liquid crystal display (LCD), touchscreen, a cathode ray tube (CRT), and software and hardware support for display technologies), audio interface(s) 1108 (e.g., microphones, speakers and software and hardware support for microphone input/output and speaker input/output). The electronic device 1100 is also shown to include user interface(s) 1110 (e.g., keyboard, buttons, switches, touchpad, touchscreens, and software and hardware support for user interfaces).

The above description is intended to be illustrative, and not restrictive. For example, the above-described embodiments (or one or more aspects thereof) may be used in combination with each other. Other embodiments will be apparent to those of skill in the art upon reviewing the above description. In this document, the terms "a" or "an" are used, as is common in patent documents, to include one or more than one. In this document, the term "or" is used to refer to a nonexclusive or, such that "A or B" includes "A but not B," "B but not A," and "A and B," unless otherwise indicated. In the event of inconsistent usages between this document and those documents so incorporated by reference, the usage in the incorporated reference(s) should be considered supplementary to that of this document; for irreconcilable inconsistencies, the usage in this document supersedes the usage in any incorporated references.

Although the claimed subject matter has been described with reference to specific embodiments, it will be evident that various modifications and changes may be made to these embodiments without departing from the broader spirit and scope of what is claimed. Accordingly, the specification and drawings are to be regarded in an illustrative rather than a restrictive sense. The scope of the claims should be determined with reference to the appended claims, along with the full scope of equivalents to which such claims are entitled. In the appended claims, the terms "including" and "in which" are used as the plain-English equivalents of the respective terms "comprising" and "wherein." Also, in the following claims, the terms "including" and "comprising" are open-ended; a system, device, article, or process that includes elements in addition to those listed after such a term in a claim are still deemed to fall within the scope of that claim. Moreover, in the following claims, the terms "first,"

"second," and "third," etc. are used merely as labels and are not intended to impose numerical requirements on their objects.

The Abstract of the Disclosure is provided to comply with 37 C.F.R. § 1.72(b), requiring an abstract that will allow the reader to quickly ascertain the nature of the technical disclosure. It is submitted with the understanding that it will not be used to interpret or limit the scope or meaning of the claims.

What is claimed is:

1. A method comprising:
   detecting a pattern of medium reservations by a first wireless device comprising detecting that the first wireless device has indicated a reservation duration that meets or exceeds a threshold duration value, wherein the reservation duration is to reserve a medium, wherein the detecting that the first wireless device has indicated the reservation duration that meets or exceeds the threshold duration value comprises detecting that a sum of reservation durations associated with two or more frames received from the first wireless device meets or exceeds the threshold duration value; and
   responsive to detecting the pattern of medium reservations, providing a mitigation operation to prevent a second wireless device from yielding the medium to the first wireless device.

2. The method of claim 1, wherein detecting the pattern of medium reservations by the first wireless device comprises detecting that an idle period of the medium is less than a threshold idle period.

3. The method of claim 1, wherein detecting the pattern of medium reservations by the first wireless device comprises detecting that a number of frames received from the first wireless device indicate a reservation duration that meets or exceeds the threshold duration value and that the number of frames meet or exceed a threshold number of frames.

4. The method of claim 1, further comprising:
   determining an interval of a plurality of frames received from the first wireless device, wherein providing the mitigation operation comprises using the determined interval to determine a time to transmit a mitigation signal to interfere with reception of at least one of the plurality of frames by the second wireless device; and
   transmitting the mitigation signal to the second wireless device at the determined time.

5. The method of claim 4, wherein the transmitting of the mitigation signal to the second wireless device comprises transmitting using transmit beamforming or narrowband transmission.

6. The method of claim 1, wherein the providing the mitigation operation comprises transmitting a mitigation signal to the second wireless device via the medium to cause the second wireless device to switch to communication via another wireless medium.

7. The method of claim 1, wherein the providing the mitigation operation comprises causing the second wireless device to clear a network allocation vector (NAV) value associated with the reservation duration indicated by the first wireless device.

8. The method of claim 7, wherein the causing the second wireless device to clear the NAV value associated with the reservation duration indicated by the first wireless device comprises transmitting a CFend control frame.

9. The method of claim 1, wherein the mitigation signal comprises a vendor specific information element (IE) that identifies the first wireless device to prevent the second wireless device from yielding the medium to a transmission by the first wireless device.

10. A method comprising:
    detecting a pattern of medium reservations by a first wireless device comprising detecting that the first wireless device has indicated a reservation duration that meets or exceeds a threshold duration value, wherein the reservation duration is to reserve a medium, wherein detecting the pattern of medium reservations by the first wireless device comprises detecting that a number of frames received from the first wireless device indicate the reservation duration that meets or exceeds the threshold duration value and that the number of frames meets or exceeds a threshold number of frames; and
    responsive to detecting the pattern of medium reservations, providing a mitigation operation to prevent a second wireless device from yielding the medium to the first wireless device.

11. The method of claim 10, wherein detecting the pattern of medium reservations by the first wireless device comprises detecting that an idle period of the medium is less than a threshold idle period.

12. The method of claim 10, wherein detecting the pattern of medium reservations by the first wireless device comprises determining an interval of a plurality of frames received from the first wireless device and comparing a reservation duration of the plurality of frames to the interval of the plurality of frames.

13. The method of claim 10, further comprising:
    determining an interval of a plurality of frames received from the first wireless device, wherein providing the mitigation operation comprises using the determined interval to determine a time to transmit a mitigation signal to interfere with reception of at least one of the plurality of frames by the second wireless device; and
    transmitting the mitigation signal to the second wireless device at the determined time.

14. The method of claim 13, wherein the transmitting of the mitigation signal to the second wireless device comprises transmitting using transmit beamforming or narrowband transmission.

15. The method of claim 10, wherein the providing the mitigation operation comprises transmitting a mitigation signal to the second wireless device via the medium to cause the second wireless device to switch to communication via another wireless medium.

16. The method of claim 10, wherein the providing the mitigation operation comprises causing the second wireless device to clear a network allocation vector (NAV) value associated with the reservation duration indicated by the first wireless device.

17. The method of claim 16, wherein the causing the second wireless device to clear the NAV value associated with the reservation duration indicated by the first wireless device comprises transmitting a CFend control frame.

18. The method of claim 10, wherein the mitigation signal comprises a vendor specific information element (IE) that identifies the first wireless device to prevent the second wireless device from yielding the medium to a transmission by the first wireless device.

19. A method comprising:
    detecting a pattern of medium reservations by a first wireless device comprising detecting that the first wireless device has indicated a reservation duration that meets or exceeds a threshold duration value, wherein the reservation duration is to reserve a medium;

determining an interval of a plurality of frames received from the first wireless device;

responsive to detecting the pattern of medium reservations, providing a mitigation operation to prevent a second wireless device from yielding the medium to the first wireless device, wherein providing the mitigation operation comprises using the determined interval to determine a time to transmit a mitigation signal to interfere with reception of at least one of the plurality of frames by the second wireless device; and transmitting the mitigation signal to the second wireless device at the determined time.

20. The method of claim 19, wherein detecting that the first wireless device has indicated the reservation duration that meets or exceeds the threshold duration value comprises detecting that a sum of reservation durations associated with two or more frames received from the first wireless device meets or exceeds the threshold duration value.

21. The method of claim 19, wherein detecting the pattern of medium reservations by the first wireless device comprises detecting that an idle period of the medium is less than a threshold idle period.

22. The method of claim 19, wherein detecting the pattern of medium reservations by the first wireless device comprises detecting that a number of frames received from the first wireless device indicate a reservation duration that meets or exceeds the threshold duration value and that the number of frames meet or exceed a threshold number of frames.

23. The method of claim 19, wherein detecting the pattern of medium reservations by the first wireless device comprises comparing a reservation duration of the plurality of frames to the interval of the plurality of frames.

24. The method of claim 23, wherein the transmitting of the mitigation signal to the second wireless device comprises transmitting using transmit beamforming or narrowband transmission.

* * * * *